July 3, 1956  H. O. KYLIN  2,753,502
ELECTRIC MOTOR CONTROL FOR SPINDLE POSITIONER
Filed Dec. 2, 1952  3 Sheets-Sheet 1

INVENTOR.
HENRIK O. KYLIN
BY
ATTORNEY

INVENTOR.
HENRIK O. KYLIN

United States Patent Office 2,753,502
Patented July 3, 1956

2,753,502
ELECTRIC MOTOR CONTROL FOR SPINDLE POSITIONER

Henrik O. Kylin, Aurora, Ohio, assignor to Bardons and Oliver, Inc., Cleveland, Ohio, a corporation of Ohio Application December 2, 1952, Serial No. 323,646

2 Claims. (Cl. 318—265)

My invention relates to machine tools and more particularly to means for stopping the rotation of a moving part of a machine tool such as a spindle, at a predetermined point of rotation.

I am aware that mechanical means have been employed heretofore for energizing electrical circuits whereby the moving part of a machine tool may be stopped or controlled. Such mechanisms are not only subject to wear but become noisy in operation and are not always reliable or positive in action.

It is one of the objects of the present invention to provide a positioner for a movable part of a machine tool such as the machine tool spindle, which is positive in operation and simple in construction.

A further object of the invention is to provide means for stopping the work spindle of a machine tool in a predetermined position to thereby expedite the loading and unloading of work pieces in the machine.

A further object of the invention is the provision of a light sensitive circuit actuated by a beam of light in the path of movement of the machine tool element to be stopped.

Another object of the invention is to provide means for stopping the work spindle of a machine in a predetermined rotative position, including means for slowing down the rate of the spindle to a predetermined rate and means responsive to said reduced rate to energize a light sensitive circuit, said spindle having a portion for interrupting said light sensitive circuit.

Another object of my invention is the provision of means of the above named character which can readily be attached to the machine tool as a unit and which likewise may readily be detached therefrom.

Other objects and advantages of my invention will appear from the following description, reference being made to the accompanying drawings in which like reference characters are employed to designate like parts throughout the same.

In carrying out my invention I provide an extremely simple means for bringing a rotating spindle of a machine tool to a stop in a selected angular position of rotation. In its broader aspects, the invention consists of means by which a spindle running at full working speed may first be slowed down to a predetermined slow speed and while running at such slow speed, may be brought to a stop in a selected position by applying direct current to the driving motor in response to the energization of a circuit by light sensitive means or by magnetic means.

Figure 1:
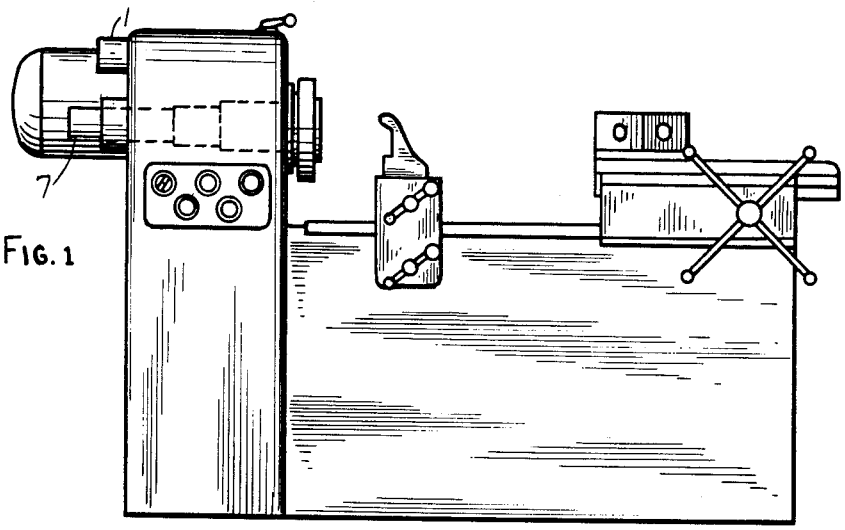
Fig. 1 is a side elevation of a machine tool showing an embodiment of my invention applied thereto in use.
Figures 3, 4:
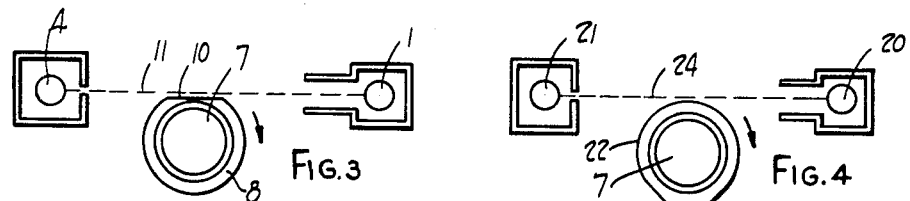
Fig. 3 is a diagrammatic view of one form of the present invention.
Fig. 4 is a similar view to that shown in Fig. 3 but illustrates a modified form therefrom.
Figure 2:
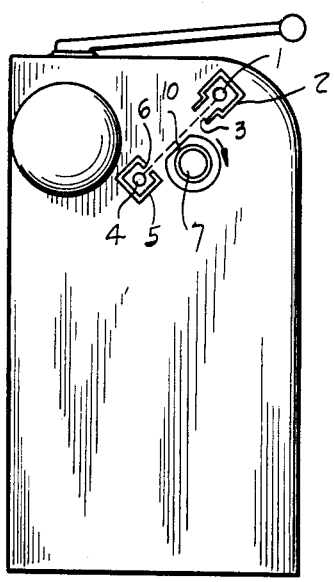
Fig. 2 is an end view of the machine tool shown in Fig. 1 looking in the direction of the head stock.

Referring more specifically to the figures of the drawing, I have illustrated in Figures 1, 2 and 3 one embodiment of the present invention for bringing a spindle to rest at a predetermined position in which I have provided a light source 1, shielded as at 2, there being provided an opening 3 in the shield or housing 2 to permit a beam of light to pass out in a selected direction. Opposite the light source is provided a light sensitive cell 4 housed within a housing 5, there being an opening 6 in the housing through which a beam of light may pass.

Figures 5, 6:
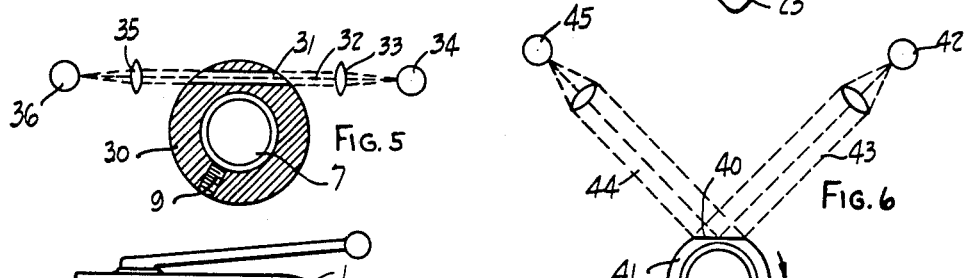
Fig. 5 is a diagrammatic view of another embodiment of the invention.
Fig. 6 is still another embodiment of the invention.

I have indicated the spindle shaft 7, the rear end of which is adapted to receive a ring or collar 8 which may be rotatably positioned on the shaft by means of a set screw or bolt passing radially through the collar and engageable with the shaft as indicated at 9 in Figure 5. The collar 8 is provided with a flat 10 and the light source 1 and the light sensitive cell 4 with their respective housings are so positioned on the head stock of the machine tool with the openings 3 and 6 respectively in alignment and facing each other, that a beam of light originating at 1 and passing through the opening 3 will in its travel toward the opening 6 be in the path of rotation of the collar 8. With the spindle rotating at working speed the light beam 11 will be broken and will not be effective to energize the light sensitive cell 4 until the rate of rotation of the spindle has been reduced to a point that the beam of light passing from the source at the cell 4 will bring momentary clear passage across the flat portion of the collar 8 as indicated in Figure 3. Upon completion of the light beam the motor is suitably plugged by direct current to bring the spindle to rest in this position as will be explained hereinafter.

In Figure 4 I have illustrated a modified form of means for interrupting a light beam between the source 20 and the cell 21 which consists of a collar 22 which may be fixed in a selected radial position on the spindle shaft 7 as described above, this collar having a projection 23 which is adapted to interrupt a light beam 24 for a fraction of the cycle of revolutions of the shaft. The period of interruption thus is considerably less by comparison than that provided for in the embodiments illustrated in Figures 2 and 3.

In Figure 5 another modified embodiment of the invention is shown in which the collar 30 is provided with a chordal opening 31 through which a beam of light may pass while the collar is in the position shown in Figure 5, the beam of light being concentrated by means of the lens 33 in front of the light source 34. The beam of light in passing through the opening 31 then passes through a lens 35 where it is concentrated upon a light sensitive cell 36.

As illustrated in Figure 6, I provide still another modified form of the invention which consists in providing a reflector element 40 on the flat of the collar 41 which is adjustably fixed to the spindle 7. In this form of the invention, light from the source 42 is directed in the direction of the lens 43 and while the spindle is in the position shown in the figure this light will be reflected as indicated by the lines 44 to the light sensitive cell 45.

Figure 7:
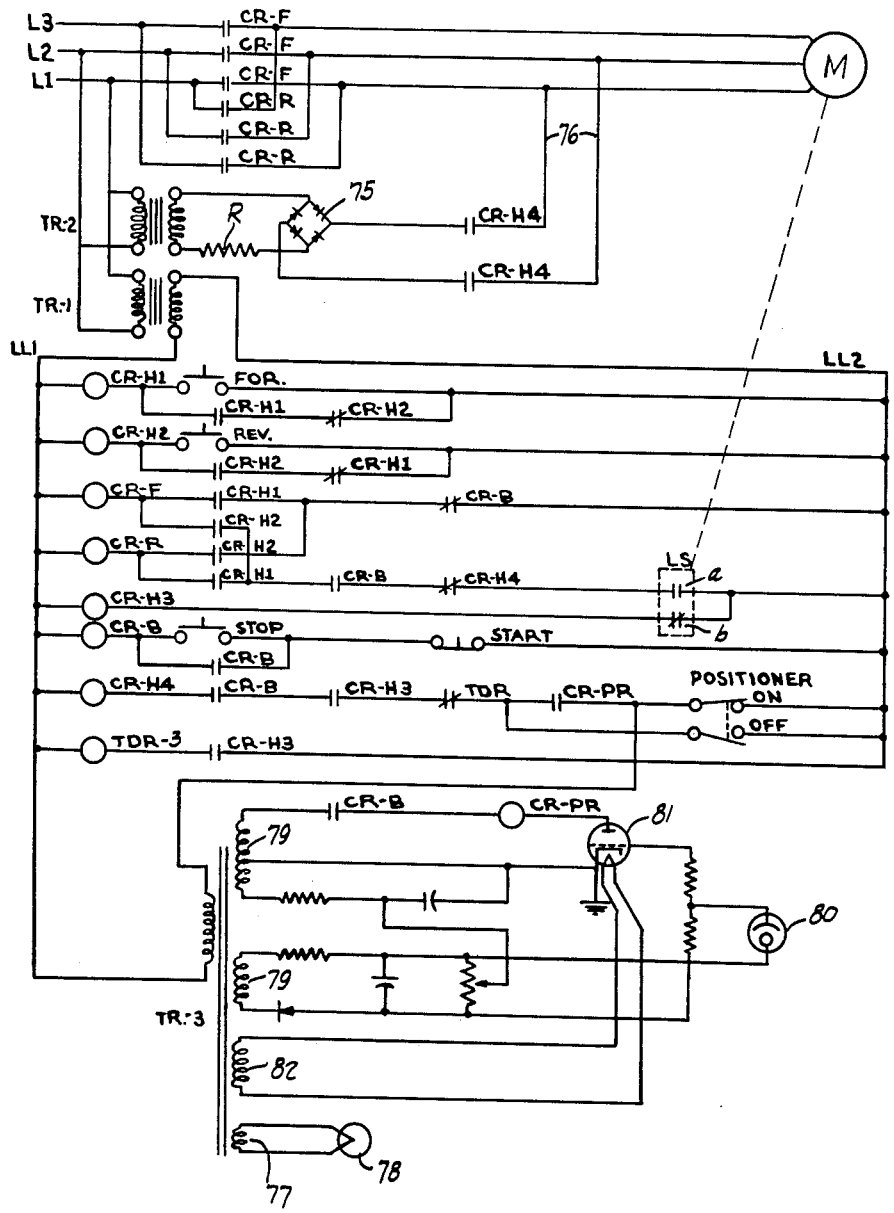
Fig. 7 is a diagram illustrating electrical circuits which may be used in connection with the embodiments shown in Figs. 1 to 6 inclusive.
Figure 8:
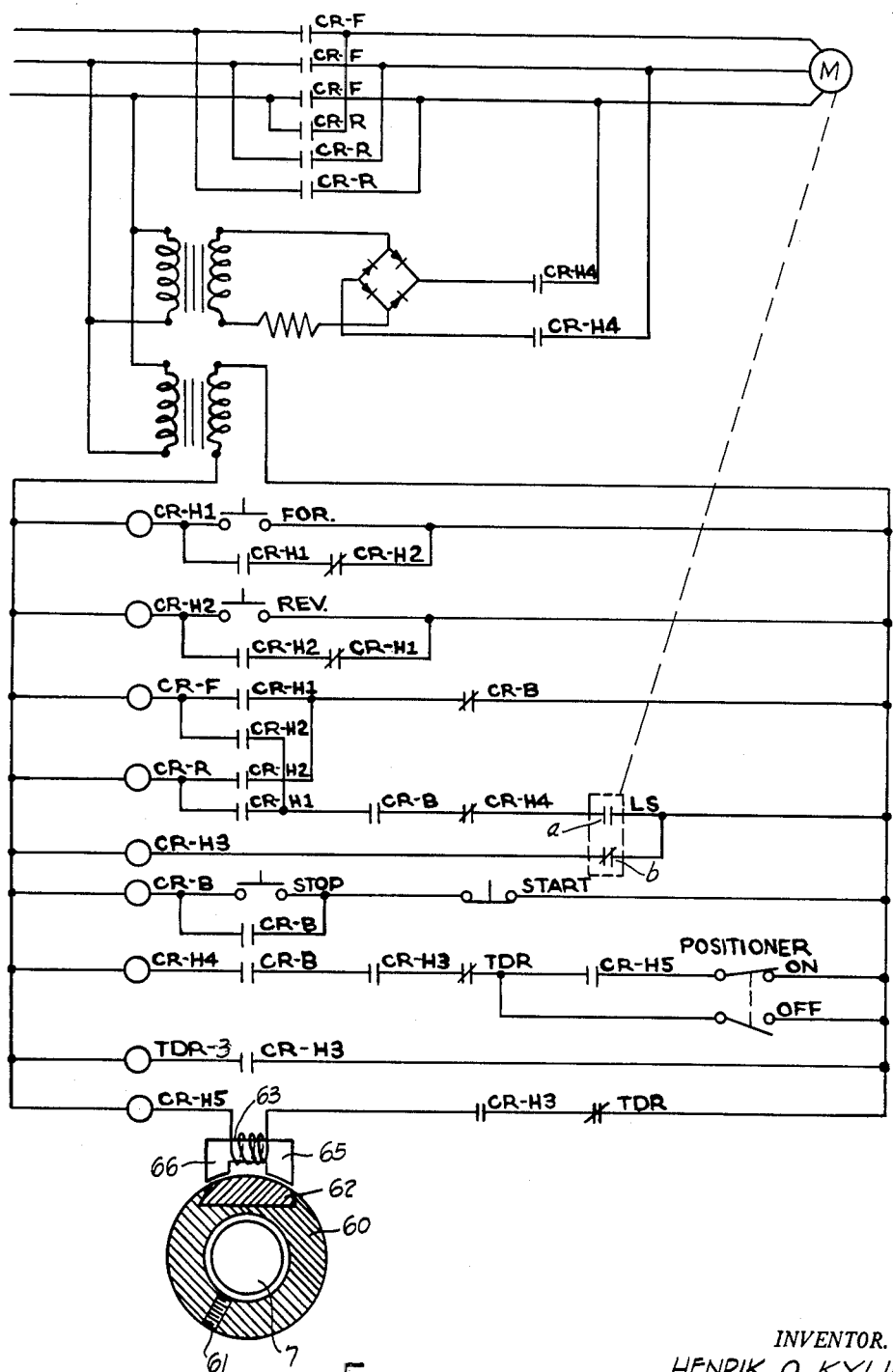
Fig. 8 is a diagram of an electrical circuit illustrating a further embodiment of the invention wherein the operation is responsive to magnetic means carried by the spindle.

In Figure 7 I have shown in diagrammatic form electrical circuits which may be employed in carrying out my invention, particularly with respect to the several embodiments disclosed above, while in Figure 8 I have shown a similar diagram of electrical circuits which may be modified and even simplified, since it may be desirable in some instances to dispense with a light source and light sensitive cell. In this figure I provide the collar 60 which may be secured in a desired position on the spindle shaft by means of a set screw 61. This collar is preferably made of a metal having low permeability and is provided with an insert 62 of a metal having high permeability. An electro-magnet 63 is positioned in close proximity to but spaced from the periphery of the collar and insert so that the pole pieces 64 and 65 will have their terminal ends in very close but spaced relation to the periphery of the collar and insert.

Referring now more particularly to Figure 7 which is a diagrammatic view of the electrical circuits which may be employed in connection with those forms of the invention described above which employ the use of a light sensitive cell:

The source of electrical current is represented by the lines L1, L2 and L3 and in this line is connected an alternating current reversible motor M. L1 and L2 supply current for the primary transformer TR2, the secondary being connected to a resistance R and a rectifier 75 to supply through the lines 76 direct current to the motor M across lines L1 and L2.

Lines LL1 and LL2 supply current from the transformer TR1 for transformer TR3. Transformer TR3 is provided with a plurality of secondary coils, one of which at 77 supplies the desired voltage to the filament of an electronic tube 78. Other secondaries 79 supply current to the photo electric relay 80 and the electronic amplifier 81. The secondary 82 furnishes current to the filament of the electronic amplifier tube 81 as indicated. Thus when the photo tube or light sensitive cell 80 is exposed to a beam of light of sufficient intensity the electronic tube 81 allows current to flow and energize relay coil CR—PR when the contact CR—B is closed.

When the "Forward" switch button is depressed as at FOR in the diagram, current flows from LL1 through coil CR—H1, through FOR to LL2 and when the forward button is released, current will flow from LL1 through coil CR—H1, through contact CR—H1, now closed, through normally closed contact CR—H2 to LL2.

It is thus understood that relay CR—H1 operates all contacts CR—H1 and that relay CR—H2 operates all contacts CR—H2.

When the button marked REV (for reverse operation) is depressed, CR—H1 is opened and CR—H2 is energized.

When the "Stop" button is depressed at "Stop" current flows through CR—B and "Stop" and through "Start." When the "Stop" button is released current flows around "Stop" through contact CR—B, now closed.

Assuming that the For button has been depressed and the circuit is through coil CR—H1, contact CR—H1 and contact CR—H2, then the circuit will be closed through coil CR—F, contact CR—H1, and contact CR—B to LL2.

The alternating current reversible motor M will be energized through lines L1, L2 and L3 and the three contacts CR—F. LS indicates two contacts, one of which is open and one of which is closed normally and when operated as a part of a plugging switch which is mechanically driven by the motor or part of the transmission connecting the motor to drive a movable part of the machine when the transmission is operating at or below a predetermined rate of speed. LS contacts $a$ are open and LS contacts $b$ are closed as shown. When however, the transmission is operating at a rate higher than that which has been predetermined, LS$a$ is closed and LS$b$ is open.

With the motor running forward, the "Stop" button is depressed, CR—B is energized and remains energized. The circuit at coil CR—F is broken by opening contact CR—B and CR—F contacts to motor open. The circuit at the plugging switch is made through coil CR—R, through contacts CR—H1, CR—B, CR—H4 and LS$a$ since the speed of the governor will be high enough to operate LS.

The contacts CR—R in line L1, L2 and L3 are energized while the motor is in reverse.

When the plugging switch falls low enough LS will operate open circuit CR—R by opening contacts LS$a$ and the circuit through coil CR—H3 will close through the closed contacts LS$b$. The circuit through the time delay relay TDR will also close through contact CR—H3.

Up to this period, the beam of light passing from the lamp to the light sensitive cell in each of the forms of the invention illustrated in Figures 1 to 6 inclusive has been interrupted and completed every time the spindle makes a complete revolution, but since relay CR—PR is not energized until contact CR—B is closed, when the "Stop" button is depressed the circuit will close through coil CR—H4, contacts CR—B, CR—H3, TDR, CR—PR and "Positioner-on," switch. Contacts in the direct current part of the circuit will close to carry direct current to one winding of the motor, thus braking the motor to a stop. At the end of the time delay provided by TDR3, the circuit through CR—H4 is open.

If the positioner switch is moved to "Off" position the circuit through CR—H4 will be energized to brake the motor immediately after CR—H3 is energized. It will close independently of the light and photo tube and CR—PR.

Referring now more particularly to Figure 8, this diagram is substantially the same as that shown in Figure 7 except that appropriate means are provided in the bottom circuit line of the figure in which the electro-magnet 63 is connected in lieu of the transformer TR3 and the accompanying electronic devices. In the present form of the invention, the insert 62 carried in the collar mounted on the spindle shaft is of high permeability while the material of the collar itself is of low permeability. Thus when the spindle shaft is in the position shown in Figure 8 with the insert opposite the pole pieces 65 of the magnet, a relatively higher flow of current will pass through the magnetic coil 63, but while the spindle is in any other position with respect to the pole pieces so that the insert is not in the path of the magnetic field between the pole pieces the current flow will be relatively low in the magnetic coil 63. In this diagram, the relay CR—H5 has operating characteristics which are such that it will become energized while the current flow through the coil 63 is high, but will not be energized while such current flow is low.

When the "Stop" button is depressed the sequence of operation is the same as that described in Figure 7 until the relay CR—H3 is energized, then CR—H5 will be energized through the magnetic coil at the time when the insert is across the pole pieces and thence through contacts CR—H3 and TDR as shown. Relay CR—H4 then becomes energized closing the contacts between the rectifier and the motor causing the motor to stop. After the time interval predetermined by TDR, relay CR—H5 will open.

From the foregoing description of my invention, it will be understood that the operation of the system may be set forth as follows:

Assuming the spindle is rotating at a preselected working rate and it is desired to stop the same so that the spindle will come to rest at a selected rotative angular position, the "Stop" button is depressed, thus energizing the plugging circuit to apply a reverse power to the motor until the rate of the spindle falls to a predetermined rate. At or below this rate the light sensitive circuit is prevailed upon to furnish a direct current source to the stator winding of the motor to thus apply a dynamic braking effort to the motor to bring it to a full stop with the spindle in the predetermined angular position. The light beam from the light source to the photocell will be uninterrupted only when the spindle is at rest in the desired angular position in each of the forms of the invention illustrated herein. The energization of the light sensitive circuit is effective only when the positioning switch is closed in response to LS and the rate of spindle rotation is slowed down to a rate permitting first a series of impulses of direct current to pass to the stator winding of the motor and then as the spindle comes to rest in the desired position permitting an uninterrupted application of direct current to the stator winding.

From the above, it will be seen that I have provided an extremely simple means whereby the movable part of a machine tool such as a spindle may be brought to rest in a predetermined position thus facilitating the loading and unloading of work pieces in the machine and giving the operator a more precise control over the machine.

I claim:

1. An electric control circuit for stopping a rotating spindle at a predetermined angular position of rotation including a reversible electric motor for rotating said spindle, a motor starting circuit, a motor starting switch in said circuit, a motor stopping switch in said circuit, a plugging circuit for said motor energizable by said motor stopping switch to slow the motor to a predetermined slow speed, relay means responsive to the slowing down of the motor, a spindle positioning circuit responsive to said relay means, a radiant energy circuit responsive to a predetermined angular position of said spindle, and a dynamic braking circuit to said motor and energizable by said radiant energy circuit to effect a stopping of the spindle in a predetermined angular position.

2. An electric control circuit for stopping a rotating spindle at a predetermined angular position of rotation including a reversible electric motor for rotating said spindle, a motor starting circuit, a motor starting switch in said circuit, a motor stopping switch in said circuit, a plugging circuit for said motor energizable by said motor stopping switch to slow the motor to a predetermined slow speed, relay means responsive to the slowing down of the motor, a spindle positioning circuit responsive to said relay means, a radiant energy circuit responsive to a predetermined angular position of said spindle, a dynamic braking circuit to said motor and energizable by said radiant energy circuit to effect a stopping of the spindle in a predetermined angular position, and a time delay relay in said positioner circuit responsive to energize said braking circuit when the motor stopping circuit is energized.

References Cited in the file of this patent

UNITED STATES PATENTS

| 1,455,795 | Logan | May 22, 1923 |
| 2,005,663 | Phily | June 18, 1935 |
| 2,242,812 | Brown | May 20, 1941 |
| 2,348,973 | Groene | May 16, 1944 |
| 2,389,368 | King | Nov. 20, 1945 |
| 2,392,068 | Sexton | Jan. 1, 1946 |
| 2,434,919 | Girard | Jan. 27, 1948 |